United States Patent
Voglmayr (10) Patent No.: US 7,959,200 B2
(45) Date of Patent: Jun. 14, 2011

(54) ADJUSTABLE LIFT ASSEMBLY FOR VEHICLE AND METHOD

(76) Inventor: Trevor Voglmayr, Cabin John, MD (US)

( * ) Notice: Subject to any disclaimer, the term of this patent is extended or adjusted under 35 U.S.C. 154(b) by 28 days.

(21) Appl. No.: 12/021,410

(22) Filed: Jan. 29, 2008

(65) Prior Publication Data

US 2009/0189403 A1  Jul. 30, 2009

(51) Int. Cl.
B60P 3/00 (2006.01)
B60P 3/34 (2006.01)
B60P 7/02 (2006.01)

(52) U.S. Cl. .............. 296/26.05; 296/100.05; 296/3; 296/165

(58) Field of Classification Search .... 296/26.04–26.05, 296/3, 10, 100.02, 100.03, 100.05, 165, 171, 296/175
See application file for complete search history.

(56) References Cited

U.S. PATENT DOCUMENTS

| | | | |
|---|---|---|---|
| 2,739,833 A * | 3/1956 | Schenkel et al. | 296/171 |
| 3,140,116 A * | 7/1964 | Speas | 296/26.05 |
| 3,374,029 A * | 3/1968 | Barker | 296/205 |
| 3,495,866 A * | 2/1970 | Bontrager | 296/26.05 |
| 3,589,576 A | 6/1971 | Rinkle et al. | |
| 4,138,046 A | 2/1979 | De Freze | |
| 4,215,894 A | 8/1980 | Sidlinger | |
| 4,272,224 A * | 6/1981 | Kabele | 417/360 |
| 4,299,421 A * | 11/1981 | Bontrager | 296/26.05 |
| 4,328,989 A * | 5/1982 | Childers | 296/26.05 |
| 4,392,682 A * | 7/1983 | Norkus, Jr. | 296/26.05 |
| 4,518,194 A * | 5/1985 | Kirkham et al. | 296/100.18 |
| 4,779,916 A * | 10/1988 | Christie | 296/3 |
| 5,114,202 A * | 5/1992 | Johnson | 296/26.05 |
| 5,190,337 A | 3/1993 | McDaniel | |
| 5,423,587 A | 6/1995 | Ingram | |
| 5,439,152 A | 8/1995 | Campbell | |
| 5,476,301 A | 12/1995 | Berkich | |
| 5,628,540 A | 5/1997 | James | |
| 6,196,604 B1 * | 3/2001 | Hoh et al. | 296/26.05 |
| 6,209,944 B1 | 4/2001 | Billiu et al. | |
| 6,332,637 B1 | 12/2001 | Chambers | |
| 6,644,704 B1 | 11/2003 | Nyberg | |
| 6,752,301 B1 | 6/2004 | Drolet | |
| 6,761,387 B2 | 7/2004 | Sloss | |
| 6,951,363 B2 | 10/2005 | Hoffman | |
| 7,246,839 B1 | 7/2007 | Nyberg | |
| 7,258,380 B1 | 8/2007 | Aguilar | |

(Continued)

OTHER PUBLICATIONS

Firgelliauto.com web site, http:www.firgelliauto.com/product_info.php?cPath=96&products_id=45, archived to Oct. 15, 2006.*

(Continued)

Primary Examiner — Dennis H Pedder
(74) Attorney, Agent, or Firm — Whyte Hirschboeck Dudek SC (57) ABSTRACT

The present disclosure is directed to an adjustable lift assembly for a flatbed vehicle such as a pickup truck. The adjustable lift assembly includes an extendible vertical member located at each corner of a vehicle flatbed. A frame is attached to an upper portion of each extendible vertical member. The frame rises and lowers with extension and retraction of the extendible vertical support members. Each extendible vertical member is placed through a respective support collar. The support collars support and maintain the extendible vertical members parallel to each other when the vehicle moves. The present adjustable lift assembly is lightweight and provides stable elevated support for a flatbed vehicle with little or no impediment to the storage area of the vehicle flatbed.

16 Claims, 6 Drawing Sheets

U.S. PATENT DOCUMENTS 7,654,603 B2 * 2/2010 Kealy ................. 296/100.02
2002/0125728 A1 9/2002 Chambers

OTHER PUBLICATIONS

Wayback Machine, http://web.archive.org/web/*/http://www.firgelliauto.com/product_info.php?cPath=96&products_id=45.*

AutoLoc Specifications Sheet for Linear Actuators Part# LA2, LA2X, LA4, LA4X, LA6, LA6X, LA8, LA8X, LA10, LA10X, LA12, LA12X, May 2, 2005.

AutoLoc Specifications Sheet for Linear Actuators Part# LA24, May 2, 2005.

* cited by examiner

ADJUSTABLE LIFT ASSEMBLY FOR VEHICLE AND METHOD

BACKGROUND

The present disclosure relates to an adjustable lift assembly for vehicles with a flatbed and methods for using the same.

Conventional adjustable lifts for flatbed vehicles, such as pickup trucks, fail to provide adequate support against wind resistance, gravity, and other forces when carrying a load at an elevated height. In addition, conventional adjustable lifts for pickup trucks are heavy, bulky, and cumbersome. The flatbed area required to mount such assemblies is large and significantly reduces the flatbed storage capacity of the vehicle.

Desirable would be an adjustable vehicle lift assembly that can be raised and lowered to any desired height and provides stability to loads carried when the lift is at an elevated position. Also desirable would be an adjustable lift assembly that is lightweight, easy to install on conventional flatbed vehicles, and occupies a minimal area of the vehicle flatbed.

SUMMARY

The present disclosure is directed to an adjustable lift assembly for a vehicle with a flatbed and methods for using the same. The adjustable lift assembly may be raised to any desired height for carrying a load. The present lift assembly does not encumber or obstruct the storage capability of the vehicle flatbed.

In an embodiment, a vehicle lift assembly is provided. The vehicle lift assembly includes an extendible vertical member located at each corner of a vehicle flatbed. A frame is attached to an upper portion of each extendible vertical member. The frame rises and lowers with extension and retraction of the extendible vertical support members. Each extendible vertical member extends through a respective support collar. The support collars support or maintain the extendible vertical members parallel to each other when the vehicle moves. A mount member may be located between a bottom end of each extendible vertical member and the flatbed.

In an embodiment, each support collar includes a brace. The brace is attachable to a vehicle sidewall. The brace may be L-shaped and have a vertical member and a horizontal member.

In an embodiment, each extendible vertical member has an upper portion and a lower portion. The support collar may be located at an upper area of the lower portion for each respective extendible vertical member.

In an embodiment, each support collar includes at least one set screw extending radially through the support collar. The set screw may be adjusted so that each extendible vertical member is supported within from about 0.1° to about 1° of true vertical. Alternatively, the set screws may be adjusted so that each extendible vertical member is positioned at true vertical. The extendible vertical members stand at true vertical or within about 0.1° to about 1° of true vertical as the vehicle moves.

In an embodiment, an end of the set screw is in contact with the lower portion of each respective extendible vertical member. Alternatively, an end of the set screw is in contact with the upper portion of each respective extendible vertical member. A low-friction element may contact the upper portion. In a further embodiment, each support collar may have two sets of set screws. The first set is in contact with the lower portion of the extendible vertical member and the second set of set screws is in contact with upper portion of the extendible vertical member.

In an embodiment, the frame supports a rack or a cover. Alternatively, the frame may simultaneously support both a rack and a cover. The rack and/or cover may form a shelter when the frame is raised to an elevated position.

In an embodiment, another vehicle lift assembly is provided. The lift assembly includes an extendible vertical member located in each corner of a vehicle flatbed. Each extendible vertical member extends through a respective support collar. A frame is attached to an upper portion of each extendible vertical member. The frame rises and lowers with extension and retraction of the extendible vertical members. The vehicle lift assembly further includes a plurality of mount members attachable to the flatbed. Each mount member has an L-shaped bracket attachable to a bottom end of its respective extendible vertical member.

In an embodiment, a gap is present between each bottom end of the extendible vertical member and its respective mount member. The L-shaped bracket suspends the extendible vertical member bottom end above the mount member to form the gap.

In an embodiment, each mount member has an area from about 4 square inches to about 8 square inches and occupies a small area of the vehicle flatbed. The lift assembly may have a weight from about 100 lbs to about 200 lbs.

In an embodiment, the lift assembly includes a support extension. The support extension is pivotally attached to the frame. The support extension may be extended above and over a cab of the vehicle when the frame is at an elevated position. The support extension enables the frame to support an oversize load on the frame and over the vehicle cab.

In an embodiment, a method for carrying a load on a vehicle is provided. The method includes positioning an extendible vertical member at each corner of a vehicle flatbed and placing each extendible vertical member through a respective support collar. A frame is attached to upper portions of extendible vertical members. The method includes raising the frame by extending the extendible vertical members and supporting, with the support collars, each extendible vertical member substantially parallel to, or parallel to, every other extendible vertical member.

In an embodiment, the method includes moving the vehicle, the supporting occurring during the moving. The vehicle may move at a rate from about 0.1 mph to about 100 mph. In a further embodiment, each support collar has at least one set screw. The method includes adjusting the set screws and holding each extendible vertical member within 0.1° to 1° of true vertical. In addition, the set screws may be adjusted to hold each extendible vertical member at true vertical. The method may further include moving the vehicle and holding each extendible vertical member within 0.1° to 1° of true vertical, or at true vertical, during vehicle movement.

In an embodiment, the method includes placing a load on the frame. The frame may be raised to any desired height. In an embodiment, the method includes raising the frame above a cab of the vehicle.

In an embodiment, the method includes supporting, with the frame, a cover, a rack, and combinations thereof. The cover may be a rigid cover, a flexible cover, or a combination thereof.

An advantage of the present disclosure is the provision of an improved adjustable lift assembly for a vehicle flatbed.

An advantage of the present disclosure is the provision of an adjustable vehicle lift assembly that is stable when the vehicle is in motion.

An advantage of the present disclosure is the provision of an adjustable vehicle lift assembly that is stable when the lift is raised to an elevated position during vehicle movement.

An advantage of the present disclosure is the provision of an adjustable lift assembly that is light weight.

An advantage of the present disclosure is the provision of an adjustable lift assembly that is easy to install on conventional vehicles having a flatbed.

An advantage of the present disclosure is the provision of an adjustable vehicle lift assembly that occupies a small portion of the flatbed area.

An advantage of the present disclosure is the ability to raise the lift assembly to any desired height and carry a load at any desired height.

An advantage of the present disclosure is the provision of an adjustable lift assembly kit that may be readily installed on conventional pickup trucks.

DETAILED DESCRIPTION

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, etc., is from 100 to 1,000, it is intended that all individual values, such as 100, 101, 102, etc., and sub ranges, such as 100 to 144, 155 to 170, 197 to 200, etc., are expressly enumerated in this disclosure. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. For example, any numerical range recited herein includes values that are "less than" or "less than or equal to" the upper value. Similarly, any numerical range recited herein includes values that are "greater than" or "greater than or equal to" the lower value.

Figure 1:
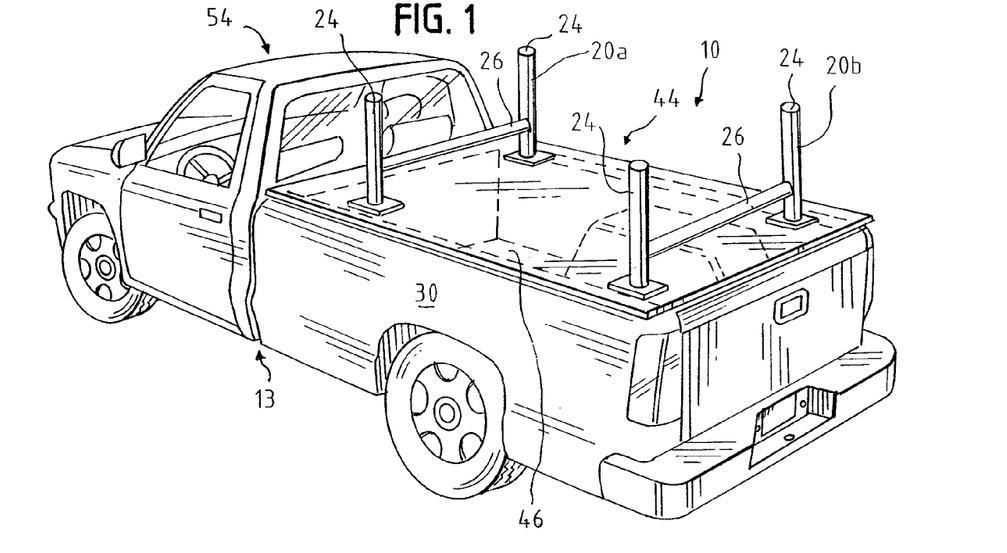
FIG. 1 is a rear perspective view of an adjustable lift assembly on a flatbed vehicle of the present disclosure.
Figure 2:
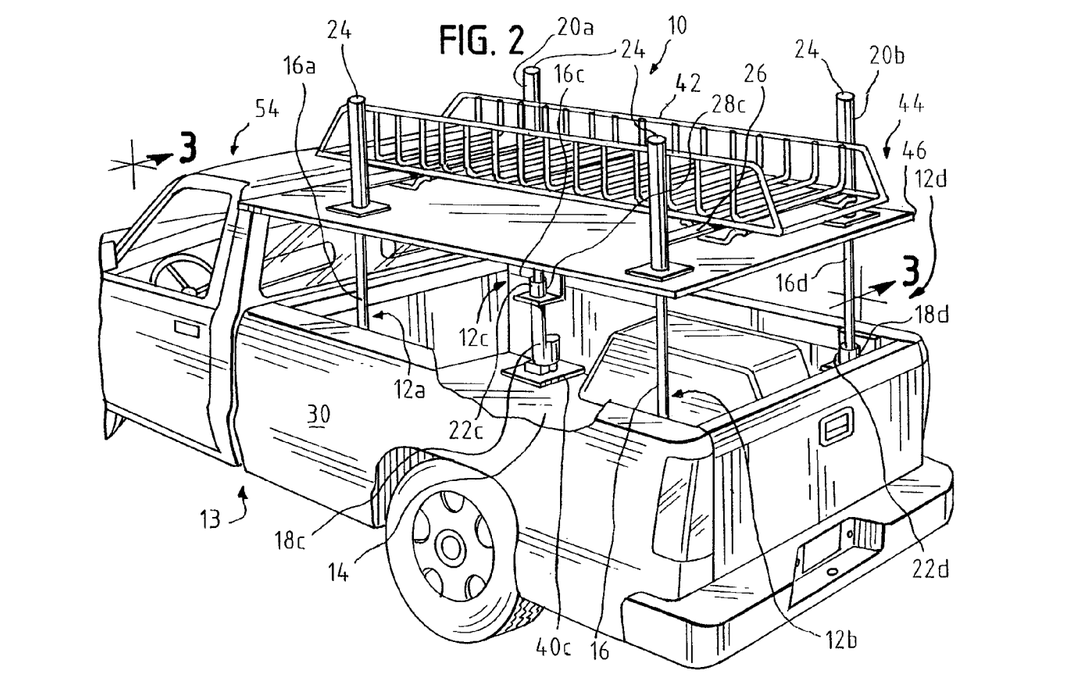
FIG. 2 is a rear perspective view of an adjustable lift assembly of the present disclosure.
Figure 3:
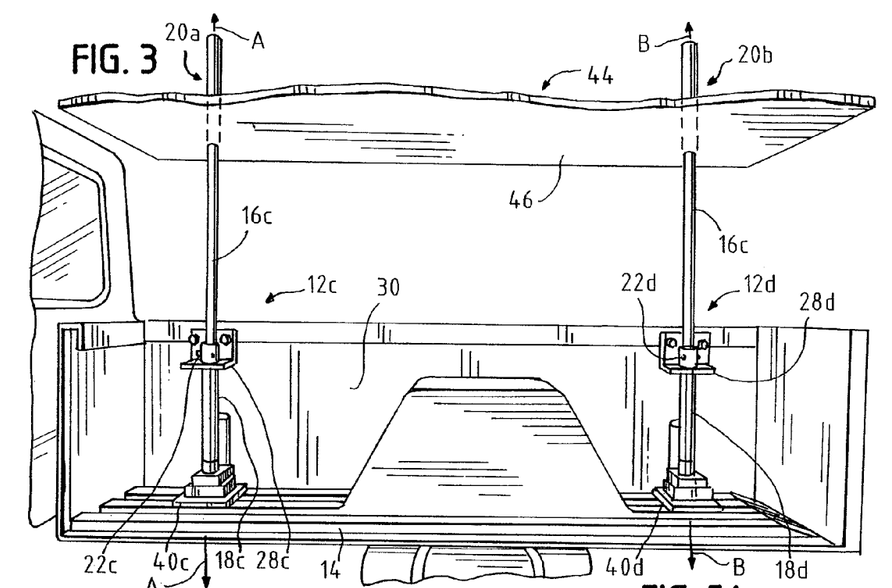
FIG. 3 is a side elevation view of the adjustable lift assembly of the present disclosure taken along line 3-3 of FIG. 2.

In an embodiment, an adjustable vehicle lift assembly 10 is provided as shown in FIGS. 1-3. The adjustable vehicle lift assembly 10 includes extendible vertical members located along a perimeter of a vehicle flatbed. The number of extendible vertical members may vary from three, to four, five, six, or more.

In an embodiment, four extendible vertical members 12a, 12b, 12c, and 12d are provided, one extendible vertical member located at each corner of a vehicle flatbed 14 as shown in FIGS. 1 and 2. It is understood that description of a single extendible vertical member applies equally to the other extendible vertical members. As used herein, a "flatbed" is a portion of a vehicle that is a substantially horizontal or a substantially flat support surface for receiving and transporting a load. Flatbeds are typically rectangular or square in shape; however, other shapes are possible and are within the scope of this disclosure. It is understood that one or more sidewalls may extend vertically along a portion of, or along the entire periphery of, the flatbed. The vehicle may be any powered or non-powered vehicle that includes a flatbed. Nonlimiting examples of suitable vehicles include a pick-up truck, a flatbed truck, and/or a trailer having a flatbed. In an embodiment, the vehicle is a pickup truck 13 as shown in FIGS. 1 and 2.

Each extendible vertical member has an upper portion and a lower portion. The upper portion is moveable with respect to the lower portion. This permits each extendible vertical member to extend (i.e., increase the length of the extendible vertical member) and retract (i.e., decrease the length of the extendible vertical member) in a substantially linear, or a linear, manner. In other words, the length of the extendible vertical member may be varied as desired. In an embodiment, an extendible vertical member has a minimum length (fully retracted) from about 0.5 ft to about 3.0 ft (or any value or subrange therebetween) or 2.5 ft, and a maximum length from about 1.0 ft to about 6.0 ft (or any value or subrange therebetween), or 4.5 ft.

Extendible vertical member 12a has an upper portion 16a and a lower portion 18a, extendible vertical member 12b has an upper portion 16b and a lower portion 18b, extendible vertical member 12c has an upper portion 16c and a lower portion 18c, and extendible vertical member 12d has an upper portion 16d and a lower portion 18d. In an embodiment, each extendible vertical member 12a-12d is a linear actuator. As used herein, a "linear actuator" is a device that develops force and motion in a linear manner, from an energy source. A linear actuator typically has a moveable elongated member that is in telescopic communication with a stationary elongated member, and a mechanism that permits linear extension and linear retraction of the moveable elongated member with respect to the stationary elongated member. It is understood that a linear actuator may have more than one moveable elongated member and/or more than one stationary elongated member. Nonlimiting examples of suitable linear actuators include mechanical linear actuators, hydraulic linear actuators, piezoelectric linear actuators, and electro-mechanical linear actuators. In an embodiment, the linear actuator is an electro-mechanical linear actuator, known under the trade designation LA, (such as LA12 or LA24) available from Autoloc.

In a further embodiment, one linear actuator (four linear actuators altogether) is placed in each corner of the vehicle flatbed in a vertical orientation. Each linear actuator may be an Autoloc LA24 linear actuator having a 24 inch stroke (i.e., maximum extended length of 54 inches and a minimum length of 30 inches) and has 800 pounds of lift power. Each LA24 linear actuator has an electric motor capable of generating 500N of linear force. This provides the adjustable lift assembly with the capacity to support up to and including 3200 pounds of load (or any value or subrange thereunder.)

A frame is attached to the upper portions 16a-16d of the extendible vertical members. The frame rises and lowers with extension and retraction of the extendible vertical members. In an embodiment, an H-shaped frame 20a is attached to upper portions 16a and 16c and an H-shaped frame 20b is attached to upper portions 16b and 16d as shown in FIG. 2. Frame 20a, 20b includes annular vertical posts 24 and horizontal posts 26. Respective upper portions extend into each vertical post as shown in FIG. 2. An attachment member (not shown), such as a screw, a bolt, or a pin, may releasably attach or permanently attach each extendible vertical member upper portion with a respective vertical post 24. The frame may be made from a rigid and durable material including such non-limiting examples as metal and/or a polymer material. In an embodiment, the frame 20a, 20b is made of a lightweight metal, such as aluminum, or round 6061 aluminum pipe.

Each extendible vertical member extends through a respective support collar. The description for a single support collar applies equally to all the support collars. In particular, extendible vertical member 12a extends through a support collar 22a, extendible vertical member 12b extends through a support collar 22b, extendible vertical collar 12c extends through a support collar 22c, and extendible vertical collar 12d extends through a support collar 22d. Each support collar is annular and surrounds, or completely surrounds, each respective extendible vertical member to support, hold, or otherwise maintain the extendible vertical member in a substantially vertical, or a vertical, position. Moreover, the support collars maintain or hold the extendible vertical members (as well as the upper and lower portions of the extendible vertical members) substantially parallel to, or parallel to, each other when the vehicle moves. The support collar may be located adjacent to or around the lower portion of the extendible vertical member or adjacent to or around the upper portion of the extendible vertical member. In an embodiment, the support collar surrounds an upper area, or an upper end of the lower portion. In yet a further embodiment, the support collar is located from about 6 inches to about 24 inches (or any value or subrange therebetween) above the flatbed 14.

When the extendible vertical members are extended, the support collars prevent wavering, wobbling, or other unsteadiness commonly experienced when transporting or moving a load at an elevated height with a vehicle. The unsteadiness may be the result of gravitational force, inertial force from movement of the vehicle, weather conditions (wind, rain, snow, heat, ice, etc.) and uneven terrain upon which the vehicle is traveling. The support collars maintain the extendible vertical members parallel to, or substantially parallel to, every other extendible vertical member during vehicle movement regardless whether the extendible vertical members are retracted or extended (partially to fully).

In an embodiment, each support collar includes a brace attachable to a vehicle sidewall. As shown in FIG. 3, a brace 28c attaches support collar 22c to a vehicle sidewall 30. Similarly, a brace 28d attaches the support collar 22d to the vehicle sidewall 30. The brace may be integral to the support collar. Alternatively, the brace may be attached, by way of a weld for example, to the support collar. The brace may be made from a rigid material and/or a durable material including such nonlimiting examples as a metal, a metal alloy, a polymer material, and combinations thereof. In an embodiment, the brace is made of a lightweight metal, such as aluminum.

Figure 4:
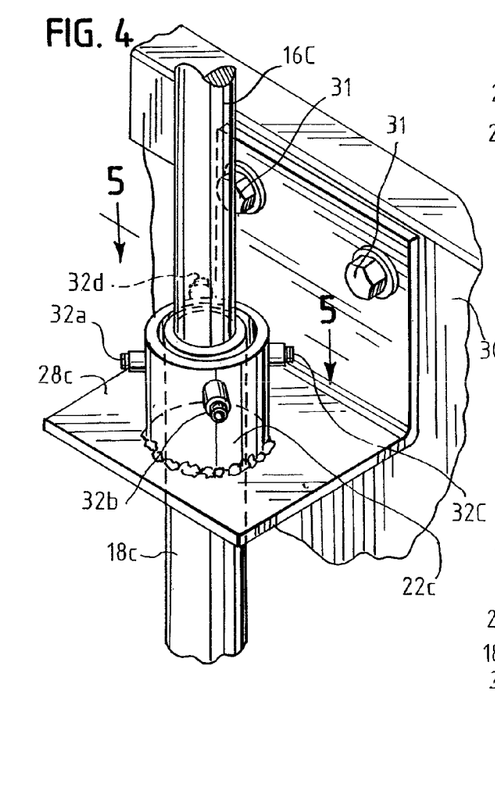
FIG. 4 is fragmentary perspective view of a support collar of the present disclosure.

In a further embodiment, the brace 28c is L-shaped as shown in FIG. 4. The bolts 31 may be used to releasably attach or permanently secure the brace 28c to the vehicle sidewall 30. In an embodiment, the bolts 31 are ⅜ inch×1½ inch grade 8 bolts with lock washers. Alternatively, other attachment members may be used to releasably attach or permanently attach the brace to the sidewall. Nonlimiting examples of suitable attachment members include one or more of the following: a screw, a pin, a rivet, an adhesive material, and/or a weld. It is understood that the description for a single brace applies equally to all the braces.

In an embodiment, the vehicle sidewall has a height of 18 inches. The L-shaped brace has a height of 3.5 inches and the support collar has a height of 3.25 inches. The L-shaped brace is attached to the vehicle sidewall such that the bottom of the L-shaped brace is 14 inches above the flatbed. It is understood that the dimensions of the L-shaped brace, the dimensions of the support collar, and the L-shaped brace height above the flatbed may be adjusted as necessary to accommodate flatbed vehicles having sidewalls with other heights.

Figure 5A:
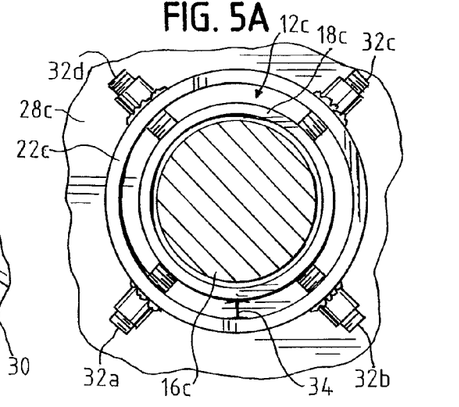
FIG. 5A is a plan view of a support collar of the present disclosure taken along line 5-5 of FIG. 4.

Each support collar may include at least one set screw as shown in FIGS. 4 and 5A. In an embodiment, the support collar 22c has four set screws 32a, 32b, 32c, and 32d, the set screws spaced equally (i.e., 90° from each other) around the support collar. It is understood that each support collar may have fewer than four set screws (1 to 3 set screws) or more than four set screws. The set screws 32a-32d extend radially through the support collar 22c so that an inner end of each set screw is present in the interior hollow area of the support collar.

In an embodiment, a gap 34 is present between the extendible vertical member and the interior of its respective support collar as shown in FIG. 5A. The set screws 32a-32d extend into the interior of the support collar 22c. The set screws may be adjusted so that the inner ends of the set screws 32a-32d contact the exterior surface of the lower portion 18c of the extendible vertical member 12c. Consequently, the set screws may be used to adjust or precisely set the position of the extendible vertical member as desired. The set screws 32a-32d thereby eliminate the gap that exists between the interior of the support collar and the exterior of the extendible vertical member. With no, or substantially no, gap between the set screws and the extendible vertical member lower portion, the set screws eliminate any play or movement between the support collar and the extendible vertical member during vehicle motion. This advantageously provides additional stability to the adjustable lift assembly 10. Moreover, elimination of the gap between the support collar and the extendible vertical member correspondingly reduces or eliminates any rattling and associated noise from the adjustable lift assembly 10 during vehicle motion.

In an embodiment, the set screws may be adjusted to precisely position the extendible vertical members. The set screws may be adjusted to ensure that each extendible vertical member is oriented at a true vertical position, or within about 0.1° to about 1° (or any value or subrange therebetween) of true vertical. As used herein, "true vertical" is an axis that is perpendicular to the flatbed. FIG. 3 shows support collar 22c (and corresponding set screws 32a-32d) supporting the extendible vertical member 12c such that the longitudinal axis of the extendible vertical member 12c extends along a true vertical axis A. Thus, the extendible vertical member 12c is at a true vertical position. Similarly, the support collar 22d (and corresponding set screws) securely holds the extendible vertical member 12*d* in a true vertical position as a true vertical axis B extends along the longitudinal axis of extendible vertical member 12*d*. Thus, the set screws for each respective support collar may be used to hold, support, or otherwise maintain one, some, or all of the extendible vertical members at true vertical, or within about 0.1° to about 1° of true vertical while the vehicle is in motion. Holding the extendible vertical members at true vertical by way of the support collars and the set screws may occur 1) when the rack is at an elevated position, 2) when the vehicle is moving, and 3) a combination of both 1) and 2). This advantageously provides a steadier load distribution across the frame and the lift assembly regardless of the vehicle speed and/or the height of the lift assembly.

Figure 5B:
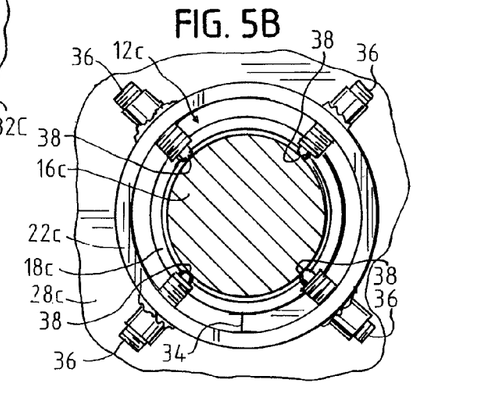
FIG. 5B is a plan view of an embodiment of a support collar of the present disclosure.

In an embodiment, the set screws may be used to support and/or precisely position the upper portion of each extendible vertical member. As shown in FIG. 5B, set screws 36 radially extend through the support collar 22*c*. The inner end of each set screw 36 includes a low-friction element 38. The low-friction element 38 may be any object that contacts the upper portion 16*c* and imparts low resistance thereto when the upper portion 16*c* extends and retracts. Nonlimiting examples of suitable low-friction elements include a ball bearing and a biased spring. In an embodiment, the low-friction element is a ball-bearing as shown in FIG. 5B.

The low-friction element 38 contacts the exterior surface of the upper portion 16*c* of the extendible vertical member 12*c* to hold, support, or maintain the upper portion 16*c* firmly in place. The low-friction element 38 also permits the upper portion to extend and retract. Thus, the set screws 36 may be used to support, hold, or maintain the upper portion of each extendible vertical member parallel to each other upper portion during vehicle motion. Moreover, the set screws 36, each with a low-friction element 38 may be used to hold, support, or otherwise maintain the upper portion 16*c* of the extendible vertical member 12*c* at a true vertical position, or within 0.1° to 1° (or any value or subrange therebetween) of true vertical while the vehicle is in motion. Provision of the low-friction element 38 advantageously permits linear extension and retraction of the upper portion while simultaneously enabling the set screws to precisely hold the position of the upper portion. Alternatively, the upper portion 16*c* may have a plurality of longitudinal grooves, each groove corresponding to a respective set screw whereby an end of the set screw protrudes into the groove in a mated relation to guide and hold the position of the upper portion. It is understood that this foregoing description applies equally to the other extendible vertical members and support collars.

In an embodiment, each support collar may have two sets of set screws. A first set of set screws may be used to support the lower portion of extendible vertical member as discussed above. The second set of set screws may be used to support the upper portion of each extendible vertical member as discussed above. It is understood that the support collar may be attached to the vehicle so that the first set of set screws may be placed in contact with the extendible vertical member lower portion and the second set of set screws may be placed in contact with the extendible vertical member upper portion.

In an embodiment, a respective mount member is located between the bottom of each extendible vertical member and the flatbed. The mount member is attachable to the bottom of a respective extendible vertical member and to the flatbed. As shown in FIGS. 1-3, mount members 40*a*, 40*b*, 40*c*, and 40*d* are attached to the bottom of respective extendible vertical members 12*a*, 12*b*, 12*c*, and 12*d*. The mount members are also attached to the flatbed 14. The mount members may be releasably attached or securely attached to each extendible vertical member and/or the flatbed as desired. The mount members 40*a*-40*d* may be made of a durable material and/or a rigid material. Nonlimiting examples of suitable material for the mounting members includes a metal, a metal alloy, a polymeric material, wood, and combinations thereof. In an embodiment, the mounting member is made of aluminum.

In an embodiment, the frame 20*a*, 20*b* supports a rack 42 and a cover 44. The frame 20*a*, 20*b* may support the rack 42 and the cover 44 simultaneously as shown in FIG. 2. Alternatively, the rack 20*a*, 20*b* may support rack 42 or the cover 44 individually. In an embodiment, the rack 42 and the cover 44 are releasably secured to the frame to promote interchangeability between the rack and the cover. The rack 42 and/or the cover 44 may be made of a rigid and/or durable material such as a metal, a metal alloy, or a polymeric material. Alternatively, the rack and/or the cover may be made of a flexible material such as a fabric, a canvas, an elastomeric material, or any combination thereof.

In an embodiment, the cover 44 is a tonneau cover 46. The tonneau cover may be rigid (hard) or flexible (soft) as desired. In an embodiment, the tonneau cover 46 is rigid and includes a gasket (not shown) on the underside periphery. The gasket provides a watertight seal between the tonneau cover and the vehicle sidewalls when the extendible vertical members are fully retracted.

Figure 9:
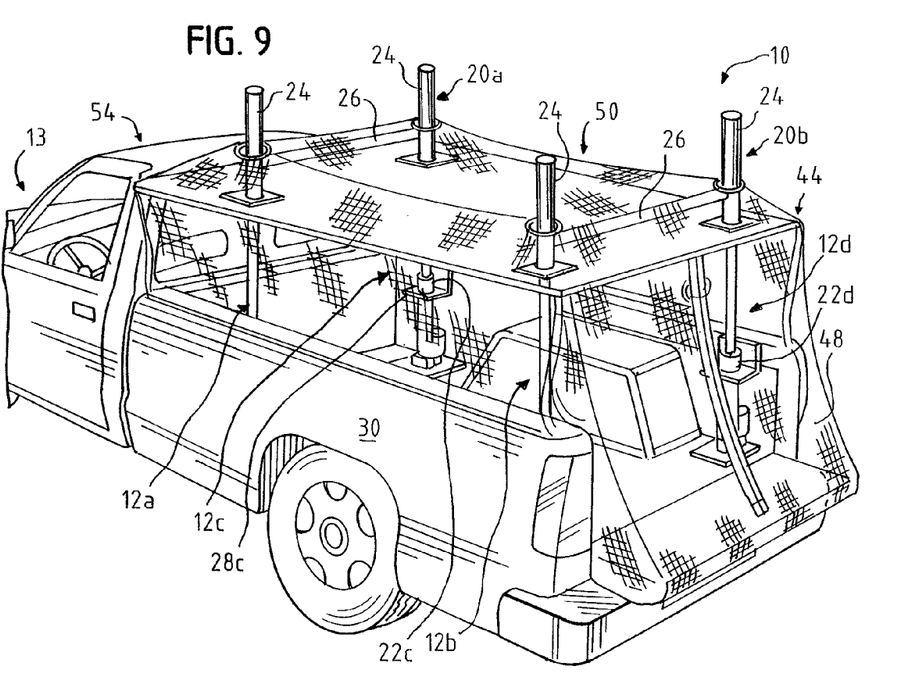
FIG. 9 is a rear perspective view of an embodiment of the adjustable lift assembly of the present disclosure.

In an embodiment, the cover is a flexible cover 48 as shown in FIG. 9. The flexible cover 48 may be made of fabric, canvas, a polymeric material, an elastomeric material, and any combination thereof. In addition, the flexible cover 48 may be transparent, translucent, or opaque and may contain a combination of portions that are transparent, translucent, and/or opaque. The flexible cover 48 may be placed on the frame 20*a*, 20*b* to form a shelter 50 above the flatbed 14 when the frame 20*a*, 20*b* is in an elevated position. The flexible cover 48 may be used with or without the tonneau cover 46 to form the shelter 50. The shelter 50 may be fully enclosed or partially enclosed as desired.

Figure 10:
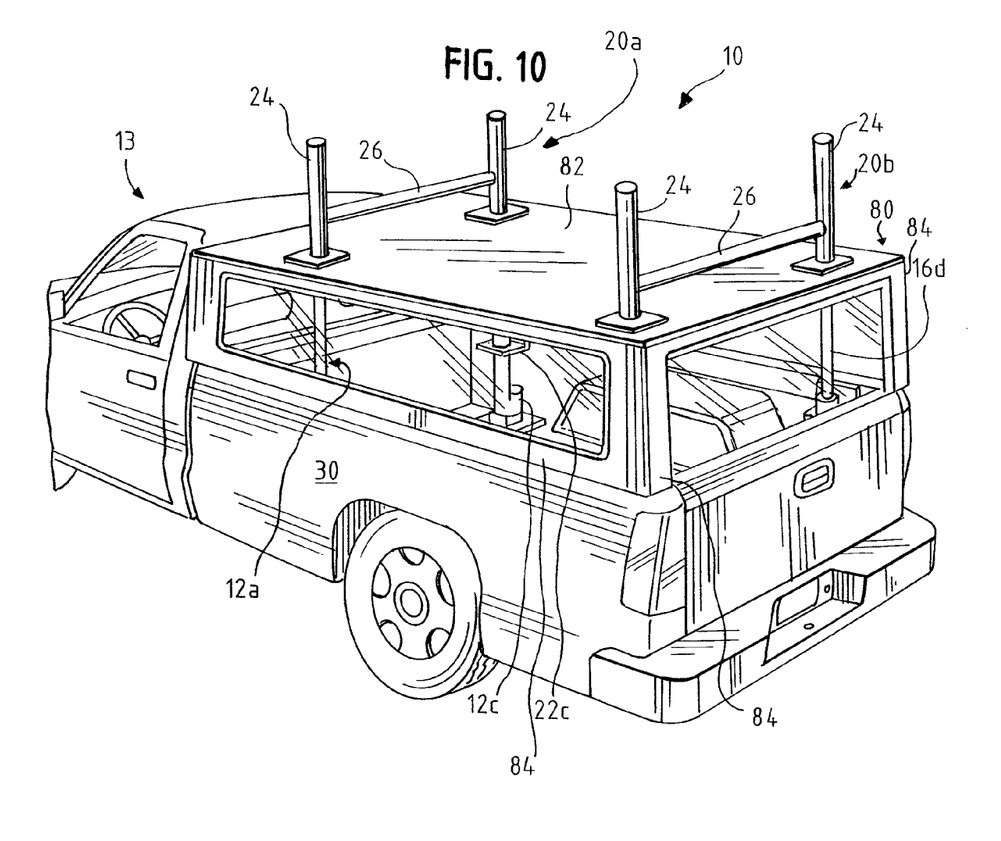
FIG. 10 is a rear perspective view of an embodiment of the adjustable lift assembly of the present disclosure.
Figure 11:
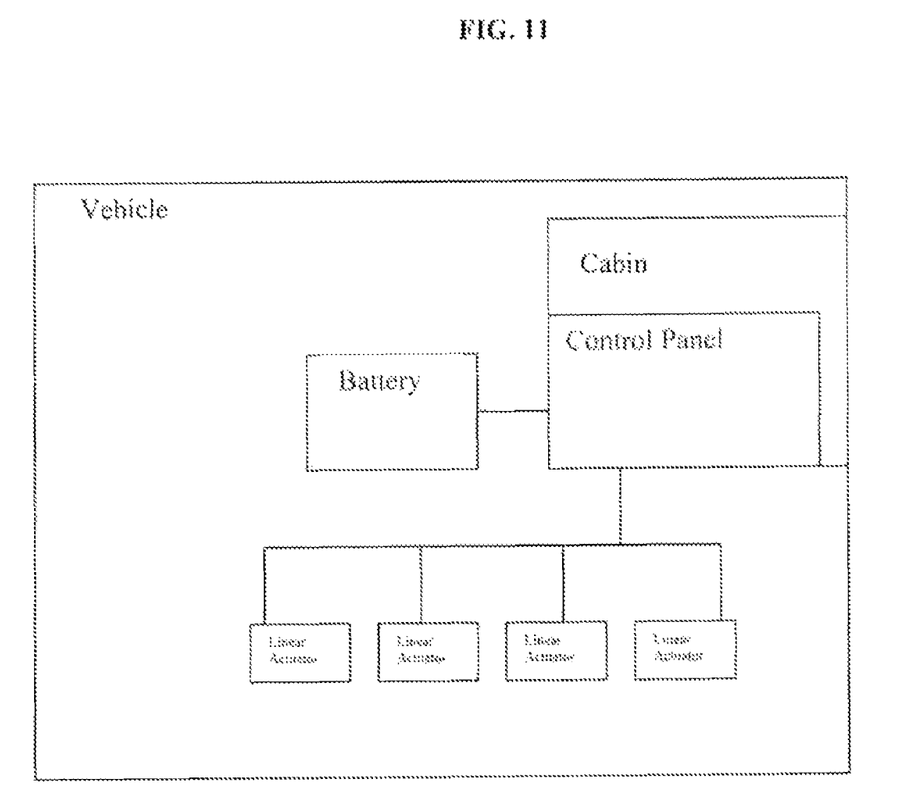
FIG. 11 is a schematic representation of a control panel connected to vertical linear actuators in accordance with an embodiment of the present disclosure.

In an embodiment, the cover is a rigid cover 80 as shown in FIG. 10. It is understood that the frame 20*a*, 20*b* is raised to an elevated position in order to accommodate the rigid cover 80. The rigid cover 80 includes a top panel 82, and side panels 84. The top panel 82 may or may not be the tonneau cover. The side panels 84 are releasably attachable to the top panel 82, the sidewall 30, and/or the frame 20*a*, 20*b*. The top panel 82 and the side panels 84 securely enclose the interior flatbed area. With the top panel 82 and the side panels 84 secured, the enclosed interior flatbed area is suitable for transporting a load. In an embodiment, the enclosed interior flatbed area may house people and/or animals for transport by the pickup truck 13. The adjustable lift assembly advantageously provides an enclosed flatbed area for the transport of people, animals, and/or objects therein.

Figures 8, 8A:
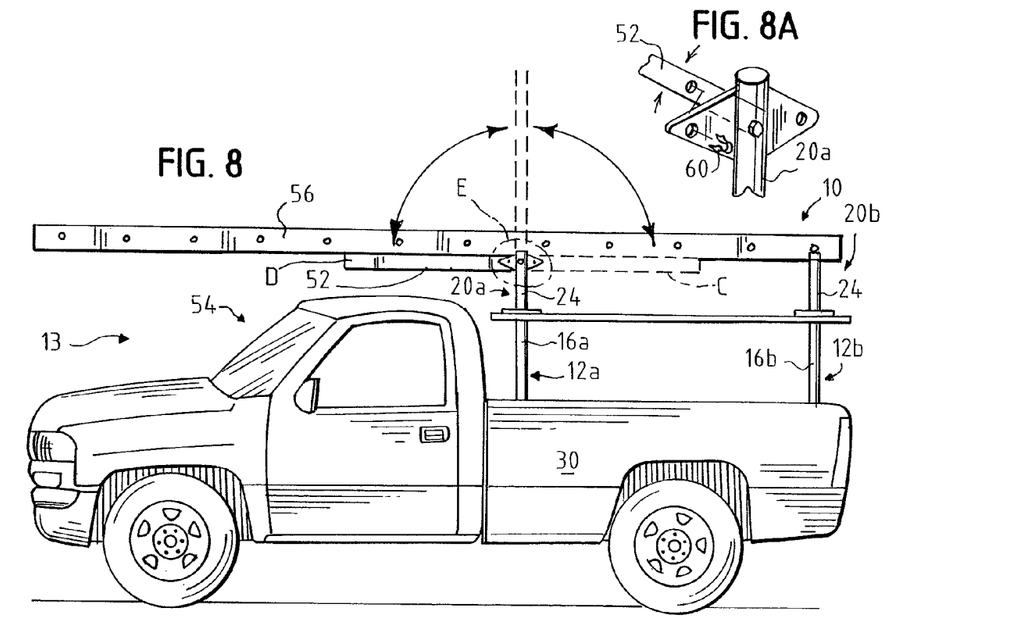
FIG. 8 is a side elevation view of a vehicle with an embodiment of the adjustable lift assembly of the present disclosure.
FIG. 8A is an enlarged perspective view of area E of FIG. 8.

In an embodiment, frame 20*a* includes a support extension 52 as shown in FIG. 8. The support extension 52 may be pivotally attached to the frame 20*a*. This permits the support extension to be pivotally placed to a stowed position C (shown in phantom) when the extendible vertical members are in a retracted position. When the extendible vertical members are in an elevated position, the support extension 52 may be pivotally moved to an extended position D. The support extension 52 enables the adjustable lift assembly to support and carry oversize loads and/or loads that extend above a cab 54 of the vehicle. For example, placement of the support extension 52 in the extended position D enables the frame 20*a*, 20*b* to support an oversize load, such as a ladder 56, when the frame is raised to an elevated position.

The support extension 52 may be releasably secured into the stowed position and/or the extended position. As shown in FIG. 8A, a fastening device may be used to extend through on opening on a plate of the frame 20a and also through a cooperating opening in the support extension 52. The fastening device may be any releaseably securable fastening device as is commonly known in the art. In an embodiment, the fastening device is a cotter pin 60 as shown in FIG. 8A. Another support extension may be attached to the frame 20b in a similar manner.

In an embodiment, the frame 20a, 20b supports a box (not shown). A top portion of the box may be releasably secured to the horizontal posts 26, with a bottom of the box optionally resting on the cover 44. Alternatively, the bottom of the box may rest on the horizontal posts 26, the box bottom being suspended above the cover 44 and positioned between the vertical posts 24, the box being releasably attached to the frame 20a, 20b. The frame 20a, 20b may support the box alone or in combination with the rack and/or the cover. The box may be used to hold and transport objects such as tools or other equipment as desired.

In an embodiment, the box is located between the tonneau cover and the underside of the horizontal posts 26 and releasably secured thereto. The box contains a tent, such as a pop-up tent, or an expandable tent, that is free-standing or is securable to the vertical posts 24. The tonneau cover supports the bottom of the tent when it is deployed. The lift assembly may be used to raise the tent to any desired elevated height. This provides the tent tenants protection from wildlife and other ground vermin when encamped in wild and/or unfamiliar terrain.

In an embodiment, another vehicle lift assembly is provided. The vehicle lift assembly includes an extendible vertical member located in each corner of a vehicle flatbed. Each extendible vertical member extends through a respective support collar. A frame is attached to an upper portion of each extendible vertical member. The frame rises and lowers with extension and retraction of the extendible vertical members. The vehicle lift assembly includes a plurality of mount members that are attachable to the flatbed. Each mount member has an L-shaped bracket. The L-shaped bracket is attachable to a bottom end of a respective extendible vertical member.

Figure 6:
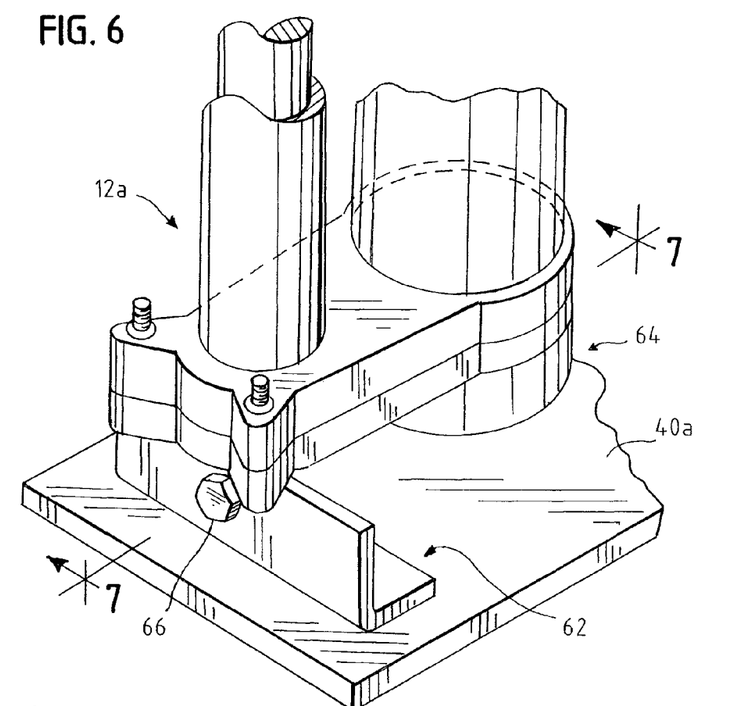
FIG. 6 is a fragmentary perspective view of a mount member of the present disclosure.
Figure 7:
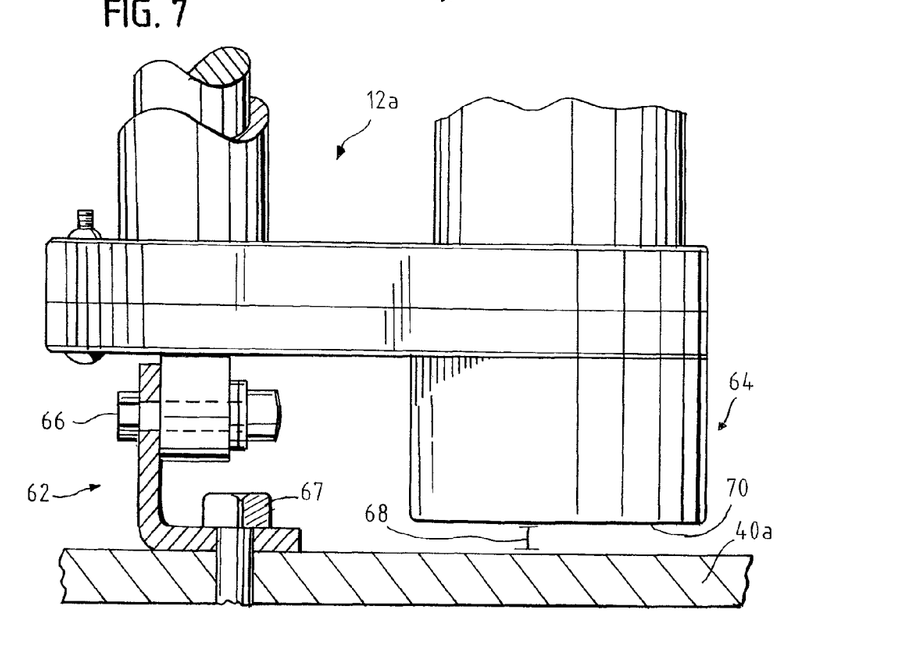
FIG. 7 is an elevation view of a mount member of the present disclosure taken along line 7-7 of FIG. 6.

In an embodiment, the mount member 40a has an L-shaped bracket 62 as shown in FIGS. 6 and 7. The L-shaped bracket may be made of a rigid and/or a durable material such as a metal, a metal alloy, or a polymeric material. In an embodiment, the L-shaped bracket 62 is aluminum. The L-shaped bracket 62 may be integral to the mount member 40a. Alternatively, the L-shaped bracket 62 may be welded to the mount member 40a.

The L-shaped bracket 62 has a hole through which an attachment member, such as a bolt 66, may extend. The bolt 66 secures a bottom end 64 of the extendible vertical member 12a to the L-shaped member 62. A bolt 67 secures the mount member 40a to the vehicle flatbed 14.

In an embodiment, the height of the L-shaped bracket 62 is such that a gap 68 exists between a lowermost surface 70 of the extendible vertical member 12a and the top surface of the mount member 40a. Attachment of the extendible vertical member 12a to the L-shaped member 62 thereby suspends the extendible vertical member 12a above the mount member 40a. Alternatively, the height of the L-shaped bracket 62 may be adjusted so that the lowermost surface 70 of the extendible vertical member 12a contacts, or otherwise rests upon, the top surface of the mount member 40a.

In an embodiment, each mount member 40a-40d has an area from about 4 square inches to about 8 square inches (or any value or subrange therebetween), or an area of about 6 square inches. Consequently, the present adjustable lift assembly requires only a small area of the flatbed for mounting purposes. The weight of the lift assembly is from about 100 lbs to about 200 lbs (or any value or subrange therebetween), or from about 120 lbs to about 180 lbs, or from 150 lbs to about 160 lbs. Thus, the present adjustable lift assembly advantageously occupies only a small proportion of the flatbed storage area and does not hinder the flatbed storage capacity while simultaneously providing a vehicle with lightweight additional storage and support capability with the movable frame 20a, 20b. It is understood that the foregoing description of the mount member 40a and the extendible vertical member 12a applies equally to the other mount members and the other extendible vertical members.

In an embodiment, a hole corresponding to each extendible vertical member is cut or is otherwise provided in the flatbed. A respective support structure for each hole is mounted to the underside of the flatbed. Each extendible vertical member is then attached to the support structure. Thus, the extendible vertical member extends from the support structure, passes through the flatbed hole and further passes through the support collar. Each extendible vertical member may be attached to a vehicle sidewall with a support collar as discussed above. Mounting the extendible vertical member below the flatbed lowers the vertical height of the extendible vertical member with respect to the vehicle sidewall. Consequently, the uppermost portion of the frame may be lower than the vehicle cab and/or lower than the top surface of the vehicle sidewall when the extendible vertical members are retracted.

In an embodiment, the linear actuators may be powered by the vehicle. The linear actuators may be placed in electrical communication (i.e., wired) with the vehicle battery. Suitable logic and circuitry may be provided to extend/retract the extendible vertical members independently and/or simultaneously. Alternatively, the logic/circuitry may be configured to enable the two front extendible vertical members to be raised with one activation and the two rear extendible vertical members to be raised with a second activation. This system may provide a dumping function. Alternatively, the two extendible vertical members may be raised together and the two left extendible vertical members may be raised together providing for a slanted roof type of support.

In an embodiment, a kit for installing an adjustable lift assembly onto a pickup truck is provided. The kit includes four linear actuators and a frame that is attachable to the upper portions of the linear actuators. The kit also includes four support collar/brace assemblies for attachment to sidewalls of the pickup truck. Four mount members, each having an L-shaped bracket, are also provided in the kit. Bolts for attaching the support collar/brace assemblies to the vehicle sidewalls, bolts for attaching the mount members to the linear actuators and the vehicle flatbed, and bolts for attaching the mount members to the flatbed are also included in the kit. The kit may also include a rack, a cover, and/or a support extension, each releasably attachable to the frame.

The kit further includes wires, electrical relays, switches, and suitable circuitry to connect the linear actuators to the vehicle battery. The kit may also include a control panel for operating the lift assembly. The control panel may be wired to the linear actuators and/or the vehicle battery and may be further wired, installed and/or mounted in the vehicle cabin, such as on the dashboard or on the cabin floor. Thus, the present disclosure advantageously provides and adjustable lift assembly kit that can be readily installed on any conventional pickup truck.

In an embodiment, a method for carrying a load on a vehicle is provided. The method includes placing or positioning an extendible vertical member at each corner of a vehicle flatbed and extending or placing each extendible vertical member through a respective support collar. The support collars may be attached to one or more vehicle sidewalls. The method further includes raising a frame attached to upper portions of extendible vertical members by extending the extendible vertical members. The method includes supporting, with the support collars, each extendible vertical member substantially parallel to, or parallel to, every other extendible vertical member.

In an embodiment, the method includes moving the vehicle and maintaining the extendible vertical members parallel to, or substantially parallel to, every other extendible vertical member as the vehicle moves. The method may further include moving the vehicle from about 0.1 mph to about 100 mph (or any value or subrange therebetween) as discussed above. The support of the extendible vertical members by the support collars maintains or holds each extendible vertical member parallel to every other extendible vertical member during vehicle movement.

In an embodiment, the method includes adjusting one or more of the set screws and holding each extendible vertical member within about 0.1° to about 1° of true vertical or at true vertical. The method may further include moving the vehicle and maintaining, or holding each extendible vertical member within about 0.1° to about 1° of true vertical as the vehicle moves.

In an embodiment, the method includes placing a load on the frame. The frame may then be raised to any desired elevated position with the present lift assembly. The load may then be transported from a first location to a second location by the vehicle. In an embodiment, the method includes raising the frame above a cab of the vehicle. An oversize load that extends over the vehicle cab may be supported by the frame with or without the deployment of the support extension and transported by the vehicle.

In an embodiment, the method includes supporting with the frame a cover, a rack, and combinations thereof. The method may further include raising the frame to an elevated position and forming a shelter over and/or around the flatbed with the cover.

It should be understood that various changes and modifications to the present embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A lift assembly on a pickup truck comprising:
   a vertical linear actuator located in each corner of the pickup truck flatbed;
   each vertical linear actuator extending through a respective support collar comprising a plurality of set screws extending radially therethrough, the set screws supporting a lower portion of each vertical linear actuator substantially parallel to each other and within from about 0.1° to about 1° of true vertical;
   each support collar comprising a brace attached to a sidewall of the flatbed;
   a frame supporting a load, the frame attached to an upper portion of each vertical linear actuator, the frame rising and lowering with extension and retraction of the linear actuators;
   a mount member located between a bottom end of each respective vertical linear actuator and the flatbed, each mount member comprising an L-shaped bracket attached to a bottom end of each respective vertical linear actuator;
   a gap between a lowermost surface of each vertical linear actuator and a top surface of each respective mount member;
   a control panel wired to each vertical linear actuator and a battery of the pickup truck, the control panel located in a cabin of the pickup truck for raising and lowering the frame; and
   the set screws hold the upper portion of each vertical linear actuator from about 0.1° to about 1° of true vertical.

2. The assembly of claim 1 wherein the set screws hold each vertical linear actuator at true vertical.

3. The assembly of claim 1 wherein each mount member has an area from about 4 square inches to about 8 square inches.

4. The assembly of claim 1 wherein the assembly has a weight from about 100 lbs to about 200 lbs.

5. The assembly of claim 1 comprising a support extension pivotally attached to the frame, the support extension positionable above a cab of the vehicle when the frame is at an elevated position.

6. A method for carrying a load on a pickup truck comprising:
   positioning a lift assembly in a flatbed of the pickup truck, the lift assembly comprising
   (i) a vertical linear actuator at each corner of the flatbed each vertical linear actuator extending through a respective support collar attached to a sidewall of the flatbed, each support collar comprising a plurality of opposing set screws extending radially through the support collar, an end of each set screw in contact with the vertical linear actuator,
   (ii) a frame supporting a load, the frame attached to upper portions of the vertical linear actuators, and
   (iii) a control panel located in the pickup truck cabin and wired to the vertical linear actuators and to a battery of the pickup truck;
   adjusting the set screws so that a lower portion and an upper portion of each vertical linear actuator is within about 0.1° to about 1° of true vertical and substantially parallel to every other vertical linear actuator;
   operating the control panel to raise and lower the frame while the pickup truck is moving; and
   maintaining each vertical linear actuator from about 0.1° to about 1° of true vertical.

7. The method of claim 6 comprising moving the vehicle and maintaining each vertical linear actuator at true vertical during the moving.

8. The method of claim 6 comprising raising the load above the pickup truck cabin.

9. The method of claim 6 comprising raising the load from about 1 ft to about 6 ft above the flatbed.

10. The method of claim 6 comprising raising the frame above a cab of the pickup truck with the control panel.

11. The method of claim 6 comprising supporting with the frame a member selected from the group consisting of a cover, a rack, a support extension, and combinations thereof.

12. The assembly of claim 1 wherein each support collar comprises four set screws equally spaced around the support collar.

13. The assembly of claim 1 wherein the frame supports a rack and a cover.

14. The assembly of claim 1 wherein the control panel is mounted on the dashboard.

15. The assembly of claim 1 wherein the load is raised above the pickup truck cabin.

16. The assembly of claim 1 wherein the load is located from about 1.0 ft to about 6.0 ft above the pickup truck flatbed.

* * * * *